United States Patent [19]

Gaglani

[11] Patent Number: 5,572,587
[45] Date of Patent: Nov. 5, 1996

[54] TELEPHONE SYSTEM AND METHOD FOR EASING WAIT TIME IN QUEUE

[75] Inventor: Pranay Gaglani, Denver, Colo.

[73] Assignee: Advanced Micro Devices, Sunnyvale, Calif.

[21] Appl. No.: 400,880

[22] Filed: Mar. 8, 1995

[51] Int. Cl.⁶ .................................................. H04Q 3/64
[52] U.S. Cl. .................... 379/266; 379/372; 379/375; 379/376; 379/396; 379/387; 379/393
[58] Field of Search ............................... 379/67, 88, 89, 379/201, 208, 211, 257, 266, 375, 376, 396, 372, 387, 393

[56] References Cited

U.S. PATENT DOCUMENTS

| | | | |
|---|---|---|---|
| 3,865,985 | 2/1975 | Stankus | 379/208 |
| 4,669,110 | 5/1987 | Daie et al. | 379/375 |
| 4,775,975 | 10/1988 | Cromwell et al. | 379/257 |
| 4,788,715 | 11/1988 | Lee | 379/266 |
| 4,942,601 | 7/1990 | Park | 379/208 |
| 5,034,975 | 7/1991 | Grimes | 379/396 |
| 5,134,651 | 7/1992 | Ortiz et al. | 379/257 |
| 5,155,761 | 10/1992 | Hammond | 379/266 |
| 5,172,408 | 12/1992 | Petty et al. | 379/375 |
| 5,181,236 | 1/1993 | Lavallee et al. | 379/266 |
| 5,233,641 | 8/1993 | Maeda | 379/257 |
| 5,265,157 | 11/1993 | Jolissaint et al. | 379/257 |
| 5,313,517 | 5/1994 | Inaguma | 379/201 |
| 5,327,486 | 7/1994 | Wolff et al. | 379/211 |
| 5,329,578 | 7/1994 | Brennan et al. | 379/211 |
| 5,388,150 | 2/1995 | Schneyer et al. | 379/89 |

*Primary Examiner*—Krista M. Zele
*Assistant Examiner*—Scott Wolinsky
*Attorney, Agent, or Firm*—Foley & Lardner

[57] ABSTRACT

A telephone system and method for easing an incoming caller's wait time in queue before being connected to a called party is disclosed. A "ready" signal initiated by the called party via the called party's telephone is provided to the caller's telephone to inform the caller that communication can commence between the caller and the called party. Thus, the caller need not wait with the caller's telephone pressed against his or her ear. Instead, the caller can put the telephone down (off-hook) and go about his or her business until receiving the ready signal. The ready signal can be provided visually and/or audibly. The ready signal can be enabled by the caller. The ready signal can also be terminated by the caller to enable the initiation of communication with the called party. "Ready enable", "ready" and "ready termination" functions can be initiated by pressing specialty keys on a telephone or can be assigned predetermined sequences of keys from a traditional telephone key pad.

23 Claims, 3 Drawing Sheets

TELEPHONE SYSTEM AND METHOD FOR EASING WAIT TIME IN QUEUE

BACKGROUND OF THE INVENTION

Modern telephone systems have many features intended to improve the efficiency of communication. For example, a business which depends upon customer-initiated telephone calls can configure a telephone system to insure that incoming callers no longer receive a busy signal when all of the incoming lines are in use. Instead of receiving a busy signal, each incoming caller will be placed in a queue to be handled in turn by the next available operator. Although such a system helps prevent lost business by substantially reducing or eliminating the receipt of a busy signal by an incoming caller, it does not solve all the problems for the business receiving the calls. In place of the traditional busy signal, an incoming caller may now experience a lengthy wait time while waiting for his or her turn in the queue.

If the wait time is unnecessarily long, the incoming caller may choose to discontinue the call prior to completion of the wait time. As a result, the business receiving the incoming call may lose a customer. Alternatively, the incoming caller may experience an increased level of frustration while he or she waits for his or her turn in the queue, thus causing the ensuing conversation to have a tone which is less than optimal to the business receiving the call. Part of the increased frustration level is due to the fact that the incoming caller must wait, with their telephone instrument pressed to their ear, until it is that caller's turn. Thus, the incoming caller is prevented from carrying on other activities while waiting for his or her turn in the queue.

SUMMARY OF THE INVENTION

It is therefore an object of the present invention to provide a system and methodology whereby an incoming caller's wait in the queue is less frustrating to the incoming caller. As a result, the business receiving the incoming calls will experience fewer lost or frustrated customers.

It is an object of the invention to provide a telephone system wherein a "ready" signal is sent from the recipient of the telephone call to the initiator of the telephone call when the initiator has moved up in the queue to the point where communication can commence between the initiator and the recipient. As a result, the telephone call initiator need not remain in a position of listening to his or her telephone instrument until the recipient is ready.

The system can provide a ready signal in either audio or visual form. For example, the system can provide an alarm or a tone which is heard by the telephone call initiator as it is broadcast from his or her telephone instrument. The system may also provide a visual ready signal such as a light associated with the telephone call initiator's telephone which is illuminated when the recipient of the telephone call is ready.

The system can allow for either automatic initiation of the ready signal by the recipient's telephone processing system or manual initiation by an operator of the recipient's telephone. Manual operation can include the pressing of a button specifically assigned to the function of issuing a ready signal (a "ready button"), or can alternatively comprise pressing a predetermined sequence of buttons contained in a conventional telephone key pad.

Similarly, the initiator of the telephone call can have the option of setting the ready function via either a special button or a predetermined sequence of buttons contained in the conventional key pad. The telephone call initiator can also have the option of terminating the ready signal in order to begin communicating with the recipient. The system can allow for termination of the ready signal, by, for example, pressing a button specifically assigned to this function, pressing any button on the telephone key pad, pressing a predetermined sequence of buttons on the telephone key pad or pressing the switch hook of the telephone.

BRIEF DESCRIPTION OF THE DRAWINGS

These and other objects of the present invention will be apparent to one of ordinary skill upon review of the specification and figures wherein.

DETAILED DESCRIPTION

Although the primary use of the present invention is envisioned in a situation where a large number of customers are calling a business and competing for a small number of incoming telephone lines, the invention is herein described with relation to one incoming caller and one telephone call recipient for purposes of simplicity.

Figure 1:
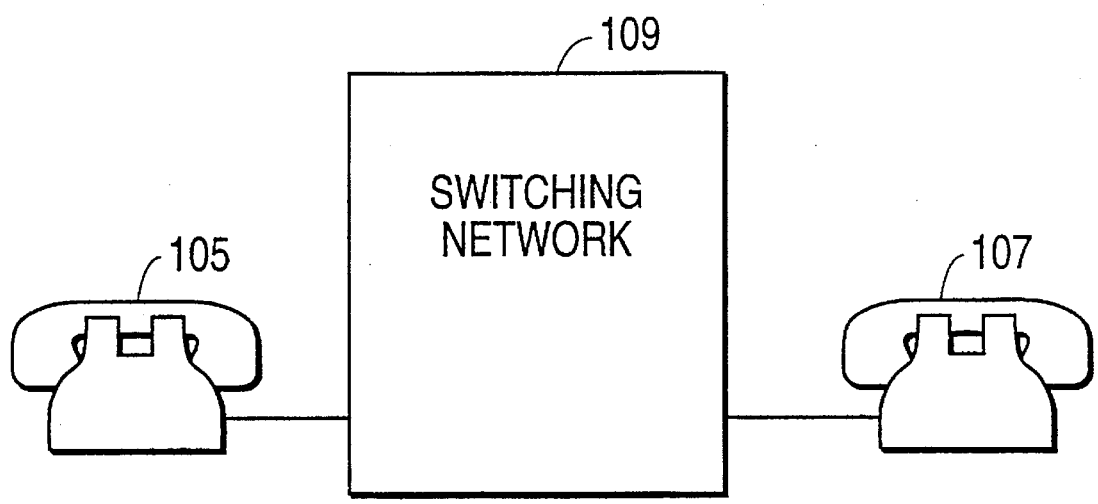
FIG. 1 shows a high level telephone connection topology.

FIG. 1 shows telephones 105 and 107 connected via switching network 109. Presume a caller initiates a telephone call from telephone 105 to telephone 107. To do so, a caller using telephone 105 dials the telephone number associated with telephone 107. Switching network 109, upon receipt of the telephone number for telephone 107, sends a ringing signal to telephone 107, causing telephone 107 to ring. If, however, telephone 107 is already in use, the traditional result is that a busy signal is sent to telephone 105 via switching network 109. The caller on telephone 105 is then forced to retry the call at a later time.

If telephone 107 is a modern telephone system, on the other hand, in place of a busy signal, telephone 105 may receive a prerecorded statement indicating that the target telephone (telephone 107) is busy and that the call initiated by telephone 105 will be handled in turn. As a result, the caller using telephone 105 will stay on the line until his or her turn comes up. Alternatively, the caller on telephone 105 can decide not to wait on the line and then choose to either retry the call at a later time or call somebody else to communicate. If the target recipient (telephone 107) is a business, the latter choice by the caller can be very costly.

The present invention provides an additional option which minimizes the negative impact on the caller of having to wait for his or her turn to communicate. Via the present invention, the caller using telephone 105 can put the handset from telephone 105 down on a desk or table upon which telephone 105 is sitting and go about his or her business until receiving a ready signal from telephone 107. The system can provide for the ready signal in the form of one or more of a visual signal such as a light on telephone 105 which illuminates, a ringing of telephone 105, and an audible alarm similar to the alarm currently heard when a telephone handset is inadvertently left off-hook.

Figure 2:
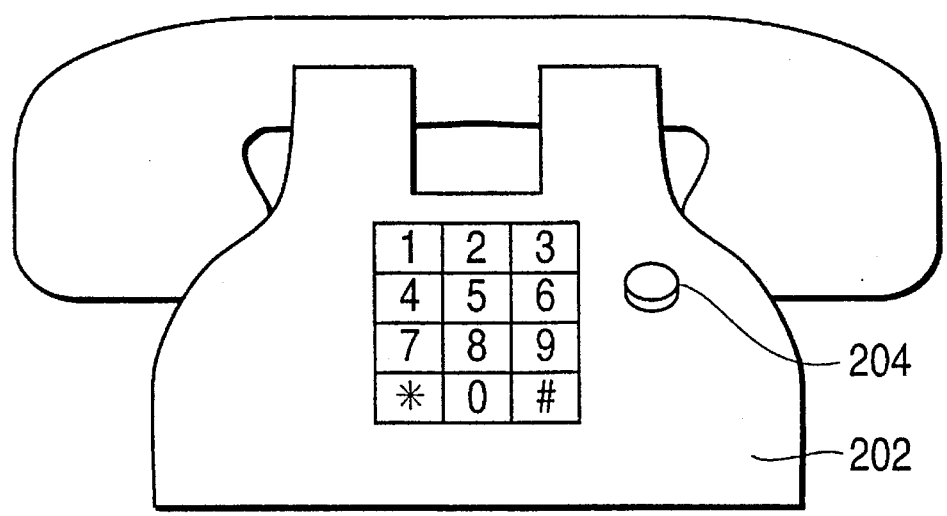
FIG. 2 shows an example of a telephone in accordance with one embodiment of the invention.

FIG. 2 shows an example of a telephone in accordance with one embodiment of the present invention. Telephone 202 is a conventional telephone with the addition of "ready button" 204. If a telephone such as telephone 202 is used for telephone 107 in the example of FIG. 1, the operator of telephone 107 can press ready button 204 when preparing to handle the next call in the queue in order to provide an indicator to the associated caller that it is now that caller's turn. Most likely, the operator of telephone 107 would first speak into the instrument and listen to hear if the calling party is still on the line. If so, the use of ready button 204 is unnecessary. If, however, the user of telephone 107 does not hear a response to a verbal inquiry, then ready button 204 can be pressed in order to send a ready signal to telephone 105.

The ready signal may take many forms. In one form, it is exactly the same as the signal currently received when a telephone is inadvertently left off the hook. Thus, the user of telephone 105 can merely place the instrument down on a table or desk (still off-hook) and go about his or her business until hearing the familiar off-hook tone. At this time, the initiator of the phone call can pick up the instrument and begin communicating with the operator of telephone 107. Of course, for this communication to occur, the "off-hook" tone must be terminated. One manner of terminating the off-hook tone is to have the off-hook tone last for a predetermined short duration, such as two or three seconds. Alternatively, the caller from telephone 105 can press a predetermined series of buttons, such as * 5, in order to terminate the off-hook tone. Alternatively, the system can allow the caller to press any of the keys on the key pad of telephone 105 to terminate the off-hook tone. Alternatively, the caller can press the switch hook button or buttons (those buttons which are suppressed by the hand set when the telephone is hung up) to terminate the "off-hook" tone.

Alternatively, the system can use a tone which differs from the off-hook tone as the ready signal so that the caller from telephone 105 can distinguish between the traditional off-hook tone and the ready signal. This configuration provides a benefit since a loss of telephone connection between telephones 105 and 107 may result in the transmission of an off-hook tone to telephone 105, thus providing the traditional signal that telephone 105 is off the hook. Therefore, a tone which a user can distinguish from the traditional off-hook tone allows the caller to immediately know upon hearing the tone whether it is an indication that the other party is now on the line or an indication that the call is disconnected.

As discussed above, the ready signal in one embodiment of the present invention can take the form of an audio signal which is transmitted from the hand set of telephone 105. If the audio signal selected is the same as the off-hook signal, then the present invention produces a second condition for generation of the off-hook signal. As discussed above, the traditional basis for generating the off-hook tone is that the telephone has been off the hook for a predetermined period of time. This can be considered "Condition 1". The present invention also provides "Condition 2" for generating the off-hook tone, which is that the person using telephone 107 presses a button such as ready button 204 while the connection is established between telephones 105 and 107. To implement this embodiment of the invention, a controlling mechanism in switching network 109 must be updated to issue the signals associated with the off-hook tone upon the occurrence of either condition 1 or condition 2 instead of its current operational scheme wherein these signals are only sent on the occurrence of condition 1.

Figure 3:
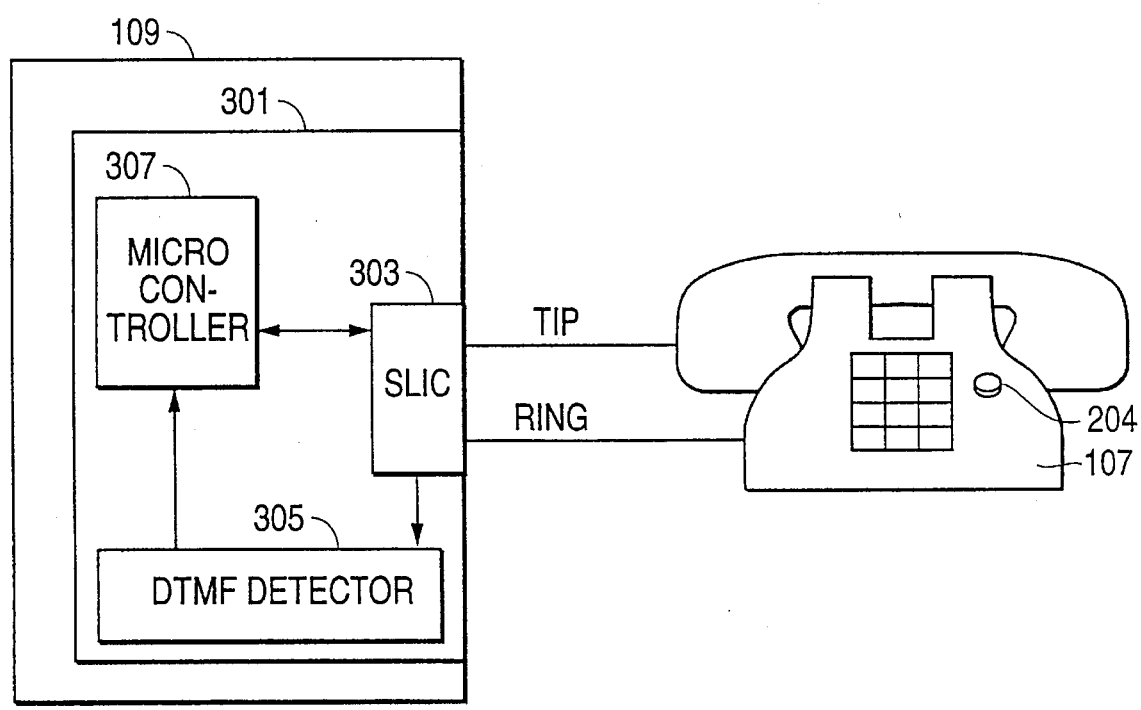
FIG. 3 shows an example of a telephone in accordance with another embodiment of the invention.

FIG. 3 shows in greater detail the connection between telephone 107 and a front end portion of switching network 109 for an exemplary implementation of one embodiment of the invention. In this configuration, the traditional off-hook tone is also used as the ready signal. Front end portion 301 of switching network 109 includes a Subscriber Line Integrated Circuit (SLIC) 303, a Dual Tone Multi-Frequency (DTMF) detector/decoder 305 and a microcontroller 307. Telephone 107 is connected to front end portion 301 via a twisted pair of wires called Tip and Ring.

The Tip and Ring wires carry voice signals along with DTMF tones. Voice signals comprise various inband frequencies from 300 Hz to 3 KHz, whereas DTMF tones are combinations of two pure tones of inband frequencies. The voice signals and DTMF tones are supplied to front end portion 301 as analog signals by the Tip and Ring wires. These analog signals are digitized by SLIC 303 and fed to DTMF detector 305.

Whenever a button of the telephone keypad is pressed, the DTMF detector detects the digitized tones and decodes the digital information to identify the key that was pressed. Information identifying the key that was pressed is then passed to microcontroller 307. Similarly, a combination of pure tones assigned to ready button 204 are carried in analog form over the Tip and Ring wires. The analog signal is then digitized by SLIC 303 and sent to DTMF detector 305, where the digital information corresponding to the ready button is recognized. As a result, an indicator that the ready button was pressed is sent from DTMF detector 305 to microcontroller 307.

Microcontroller 307, in response to the indicator received from DTMF detector 305, sends a ready signal to the telephone currently communicating with telephone 107. In the present example, the ready signal comprises the off-hook signal and the telephone communicating with telephone 107 is telephone 105 (FIG. 1). Thus, microcontroller 307 causes the issuance of an off-hook signal to telephone 105.

Thus, in this example, microcontroller 307 causes an off-hook tone to issue to telephone 105 upon the occurrence of either condition 1 (telephone 105 off the hook and not connected to another telephone for a predetermined period of time) or condition 2 (a ready button pressed on the telephone connected to telephone 105).

Figure 4:
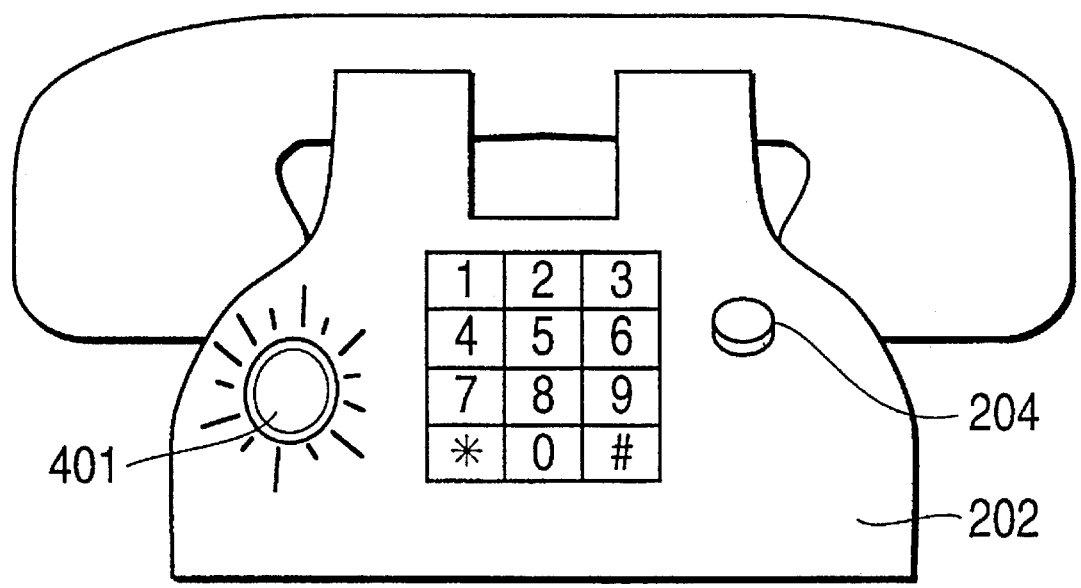
FIG. 4 shows an example of a telephone in accordance with still another embodiment of the invention.

In addition to, or instead of, the audio signal, the ready signal can take the form of a visual signal, such as the illumination of a light associated with telephone 105. An example is shown in FIG. 4 as light 401. The pressing of button 204 at telephone 107 (FIG. 1) results in the illumination of light 401 at telephone 105. Thus, the calling party may engage in activities within visual range of telephone 105 while waiting for his or her turn to communicate with telephone 107, even if the environment is sufficiently noisy such that the audio alarm described above could not be heard.

It is possible that calling parties may not wish to receive a ready signal as described above. In such a case, it may be preferable to have the ready signal transmitted only upon an appropriate selection by the calling party. For example, at the time the call is received by telephone 107, a prerecorded message could be sent to telephone 105 stating:

All our operators are busy. Please remain on the line and your call will be handled in turn. If you would like to receive a ready signal, you may press the ready enable button on your telephone. Please do not hang your phone up. If you press the ready enable button, a ready signal will be transmitted from the handset of your phone when it is your turn.

Figure 5:
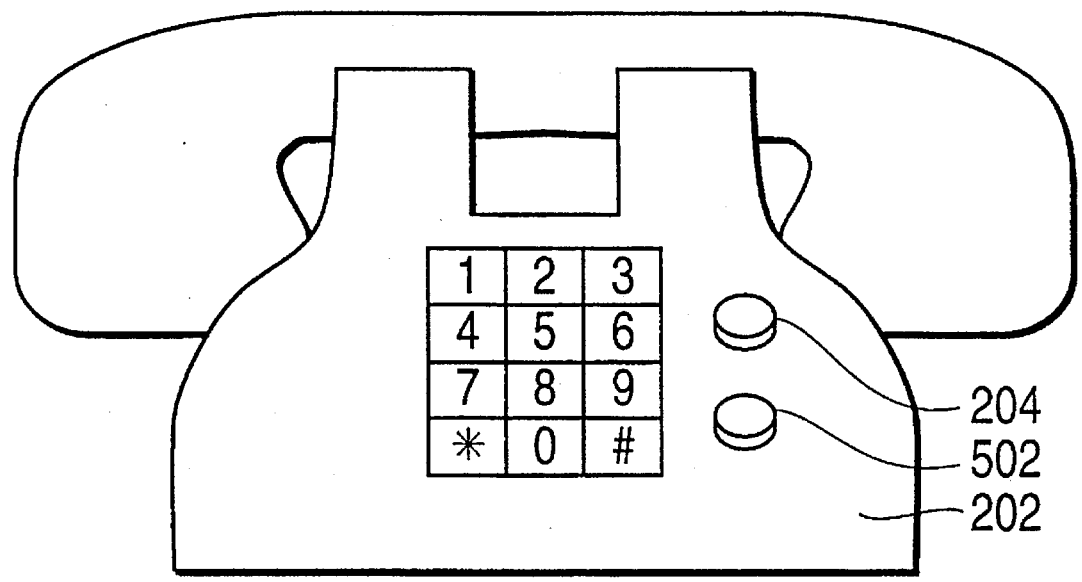
FIG. 5 shows an example of a telephone in accordance with yet another embodiment of the invention.

In accordance with the aforementioned embodiment, FIG. 5 shows an alternative version of telephone 202 which includes "ready enable" button 502. Thus, only if the caller has pressed ready enable button 502 on telephone 105 will a ready signal originated from telephone 107 be transmitted to telephone 105.

As described above, the ready signal and the ready enable signal are originated by pressing unique buttons which are in addition to those currently contained in a telephone key pad. Alternatively, these functions can be carried out using the keys of a traditional telephone key pad by assigning a specific sequence of keys to each function. For example, instead of referring to a ready enable button, the above recording could say in part, "If you wish to receive a ready signal, press STAR 21." Similarly, instead of pressing ready button 204, the operator of telephone 107 could press a previously assigned sequence of buttons, such as #7, to accomplish the same function.

In a similar manner, the system configuration can allow the recipient of a ready signal to terminate the ready signal by pressing either a unique "ready termination" button, a predetermined sequence of buttons, or any button on the key pad. Alternatively, since the telephone receiver is off the hook, the switch hook buttons can be used to terminate the ready signal.

In an alternative embodiment, either the ready signal or the ready termination signal can be initiated through voice recognition. For example, the system can issue a ready signal upon recognition of a voice signal into telephone 107. Similarly, the system can terminate the ready signal upon recognition of a voice signal into telephone 105.

This configuration can take the form of various alternative implementations. For example, issuance or termination of the ready signal can occur on the recognition of any voice signal, Alternatively, issuance or termination of the ready signal can occur on the recognition of specific voice signals previously identified to be representative of the voices of authorized users. In this example, specific users would thus be identified as authorized users of each telephone. Alternatively, issuance or termination of the ready signal can occur on the recognition of specific voice signals previously identified to be associated with specific voice commands. In this example, the telephone users would be instructed to verbally issue appropriate commands, such as "READY" or "TERMINATE" into the telephone. The appropriate action would then occur upon recognition of the associated command.

As described above, various methodologies are provided to ease the wait time of a telephone user. While several embodiments of the invention have been described, it will be understood that it is capable of further modifications, and this application is intended cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A telephone system comprising a plurality of telephones and a switching network, the telephone system further comprising:

means for sending an initiation signal from a first telephone of two connected telephones to the switching network; and means for sending a ready signal from the switching network to a second telephone of the two connected telephones in response to the initiation signal.

2. A telephone system as recited in claim 1, wherein the means for sending an initiation signal comprises a ready button associated with the first telephone.

3. A telephone system as recited in claim 1, wherein the means for sending an initiation signal comprises a predetermined series of buttons on a keypad associated with the first telephone.

4. A telephone system as recited in claim 1, wherein the ready signal is an audio signal.

5. A telephone system as recited in claim 4, wherein the audio signal is an off-hook signal.

6. A telephone system as recited in claim 1, wherein the ready signal is a visual signal.

7. A telephone system as recited in claim 6, wherein the visual signal is provided by illuminating a light associated with the second telephone.

8. A telephone system as recited in claim 1, wherein the second telephone further comprises:

means for receiving the ready signal; and means for terminating the ready signal.

9. A telephone system as recited in claim 8, wherein the means for terminating the ready signal comprises a ready termination button associated with the second telephone.

10. A telephone system as recited in claim 8, wherein the means for terminating the ready signal comprises a predetermined series of buttons on a keypad associated with the second telephone.

11. A telephone system as recited in claim 8, wherein the means for terminating the ready signal comprises a keypad associated with the second telephone, such that the ready signal is terminated when any button on the keypad is pressed.

12. A telephone system as recited in claim 8, wherein the means for terminating the ready signal comprises a switchhook associated with the second telephone.

13. A method for use in a telephone system, the method comprising the steps of:

establishing a telephone connection between a first telephone and a second telephone;

sending an initiation signal from the first telephone to a switching network; and sending, in response to the initiation signal, a ready signal from the switching network to the second telephone.

14. A method as recited in claim 13, wherein the initiation signal is sent by pressing a ready button associated with the first telephone.

15. A method as recited in claim 13, wherein the initiation signal is sent by pressing a predetermined series of buttons on a keypad associated with the first telephone.

16. A method as recited in claim 13, further comprising the step of enabling, from the second telephone, the transmission of the initiation signal from the first telephone.

17. A method as recited in claim 16, wherein the step of enabling comprises pressing a ready enable button associated with the second telephone.

18. A method as recited in claim 16, wherein the step of enabling comprises pressing a predetermined series of buttons on a keypad associated with the second telephone.

19. A method as recited in claim 13, further comprising the step of terminating the ready signal at the second telephone.

20. A method as recited in claim 19, wherein the terminating step comprises pressing a ready termination button associated with the second telephone.

21. A method as recited in claim 19, wherein the terminating step comprises pressing a predetermined series of buttons on a keypad associated with the second telephone.

22. A method as recited in claim 19, wherein the terminating step comprises pressing any button on a keypad associated with the second telephone.

23. A method as recited in claim 19, wherein the terminating step comprises pressing a switch-hook associated with the second telephone.

* * * * *